United States Patent [19]

Frings et al.

[11] Patent Number: 4,902,872
[45] Date of Patent: Feb. 20, 1990

[54] PROCESS FOR THE PRODUCTION OF A SHAPED PART FROM PIECES OF SHEET METAL OF DIFFERENT THICKNESSES

[75] Inventors: Adam Frings, Essen; Wilfried Prange, Dinslaken, both of Fed. Rep. of Germany

[73] Assignee: Thyssen Stahl AG, Duisburg, Fed. Rep. of Germany

[21] Appl. No.: 287,777

[22] Filed: Dec. 21, 1988

Related U.S. Application Data

[62] Division of Ser. No. 135,194, Dec. 18, 1987, Pat. No. 4,827,100.

[30] Foreign Application Priority Data

Dec. 22, 1986 [EP] European Pat. Off. ........... 86117911

[51] Int. Cl.⁴ .............................................. B23K 26/00
[52] U.S. Cl. ................................ 219/121.63; 428/600; 428/659

[58] Field of Search ...................... 219/121.63, 121.64; 428/600, 659, 683

[56] References Cited

U.S. PATENT DOCUMENTS 4,377,735  3/1983  Minamida et al. ......... 219/121.63 X
4,642,446  2/1987  Pennington ................... 219/121.64

FOREIGN PATENT DOCUMENTS 0095949  8/1976  Japan .............................. 219/121.64

Primary Examiner—C. L. Albritton
Attorney, Agent, or Firm—Sprung Horn Kramer & Woods

[57] ABSTRACT

A shaped member of welded pieces of sheet metal of different thickness, more particularly having a metallic anti-corrosion protection, for example of zinc, on at least one side, wherein the pieces of sheet metal are joined to one another by a laser-beam-butt-welding process and shaped as a unit.

5 Claims, 2 Drawing Sheets

FIG. 5a
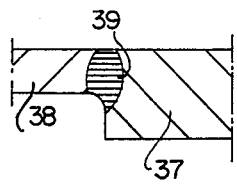
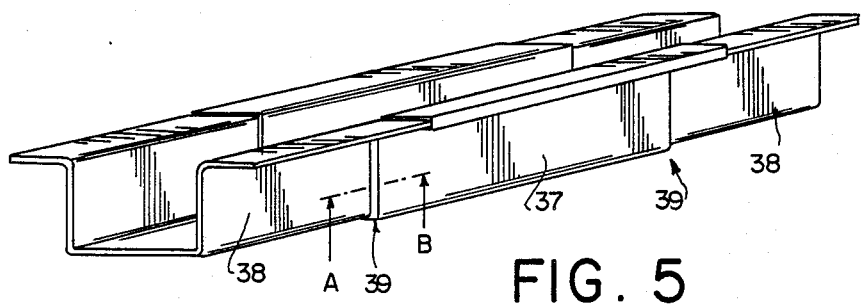
FIG. 5

PROCESS FOR THE PRODUCTION OF A SHAPED PART FROM PIECES OF SHEET METAL OF DIFFERENT THICKNESSES

This is a division of application Ser. No. 135,194, filed Dec. 18, 1987, now U.S. Pat. No. 4,827,100.

The invention relates to a process for producing shaped parts shaped by pressing or deep drawing from welded sheet metal pieces of different thicknesses, more particularly pieces having a metallic anti-corrosion protection, for example of zinc, on at least one side.

Shaped sheet metal parts are as a rule subjected to differential loading in individual zones. Examples of shaped parts subjected to differential loading in this way are the parts of a motor vehicle, more particularly the bottom plate. If such structural components are dimensioned for the maximum loading, not only is material wasted, but more particularly the shaped parts are unnecessarily heavy. These disadvantages can be obviated if the shaped parts are of different dimensions in the individual zones, in accordance with their loading.

DISCUSSION OF PRIOR ART

For example, it is known to make up the shaped parts from a number of individually shaped pieces of sheet metal of different thicknesses. The individual pieces overlap one another at their edges and are welded together by resistance welding or fusion welding.

With a shaped parts of the kind specified the advantages of saving material and lower weight are offset by the disadvantages of very expensive manufacture. A large number of individual tools are required for the shaping of the individual pieces of sheet metal. The double thickness of material, not really required for stability, in the zone where the edges overlap must be accepted to allow the interconnection without elaborate adjusting work of the pieces of sheet metal, which may also be shaped in their edge zones. In the case of surface-protected pieces of sheet metal, the cut edges are left open and the surface protection is destroyed by the welded joint, more particularly in the case of fusion welding. Lastly, the use of fusion welding leads to relatively large zones whose structure and strength differ from those of the remaining zones uninfluenced by the welding. Since in the spot welding of overlapping edge zones the zones between the welding places are open, as a rule as additional seal is necessary.

SUMMARY OF THE INVENTION

It is an object of the invention to provide a process for the production of shaped parts which enables such parts to be produced, while maintaining a construction which saves material and weight, not only in a simpler manner, but also with the least possible loss of quality in comparision with the base material. Another objective of the invention is to provide corresponding shaped parts.

In the process according to the invention, flat pieces of sheet metal of different thicknesses are butt welded with a laser beam without adding filler material and then shaped as a unit by pressing or deep drawing.

In the case of a shaped parts shaped by the pressing or deep drawing of welded pieces of sheet metal of different thicknesses having a metallic anti-corrosion protection, for example of zinc, on at least one side, the solution to the problem according to the invention is that the pieces of sheet metal are connected to one another by a laser-beam-butt-welding process and shaped as a unit.

In comparision with the prior art process, with the process according to the invention the costs of production are lower for several reasons. Since during welding the pieces of sheet metal have not yet been shaped, they can be welded to one another without relatively elaborate positioning work. Shaping is performed in one step on the welded unit and no longer separately for each piece of sheet metal. Due to the known process of butt welding by laser beam (German Patent Application P No. 35 023 68 A1) the welding zone can be small and precisely adjusted, so that the welded joint alters the material structure and strength of only negligibly small zones of the overall unit in comparision with the remaining zones. Since during laser beam welding, coatings like zinc in the welding zone evaporate and do not get into the melt, moreover no essential change takes place in the structure of the material of the joint, at any rate the material remains shapeable even in the zone of the joint. Due to the low expansion of the joint being welded without using filler material, the material adjacent the welding joint is "sacrificed" during the shaping operation if the material of the joint on its own cannot share in the deformation. Lastly, due to the low expansion of the laser-beam-welded joint, the effect of remote protection is achieved, i.e., even in the zone of the joint, which is itself not protected against corrosion, for example, by a layer of zinc, it shares in the protection afforded by the adjacent anti-corrosion layer. To enable joints as narrow as possible to be laser beam welded without the addition of a filler, the corrugations of the abutting cut edges in the plane of the sheet metal in longitudinal direction should not be greater than 0.04 mm and the spot of the laser beam not greater than 0.2 mm.

According to a preferred embodiment of the invention, the pieces of sheet metal should be welded from one side, the surface of the pieces of sheet metal lying on that side being offset in relation to one another. In that case the result is a transition between the surfaces of the two pieces of sheet metal in the form of a groove.

The positioning of the laser beam spot and the direction of the beam influences the proportion of the material to be melted in both pieces of sheet metal and therefore also the formation of the welded joint. In this case it has been found to be advantageous if the laser beam is so guided that the thicker piece of sheet metal contains the larger proportion of the melting zone.

Also advantageously welding is performed with the laser beam directed at an angle to the surface of the pieces of sheet metal, one component of the beam direction being directed towards the exposed cut edge of the projecting piece of sheet metal.

To prevent undefined energy irradiation into the material due to reflection of the laser beam, the beam should be kept away from the transitional zone between the exposed cut edge and the surface of the thicker piece of sheet metal.

A root-side drop-through or a root-side suckback of the joint on the root side of the welding location can be obviated in a very simple manenr if a gas cushion, more particularly of inert gas, acts on the rear side of the pieces of sheet metal in the welding joint zone at least during the molten liquid phase.

DESCRIPTION OF AN EMBODIMENT OF THE INVENTION

Brief Description of the Drawing

The invention will now be described in greater detail with reference to the drawings FIG. 5 is a perspective view of pieces of metal of different thicknesses welded together; and FIG. 5A is a sectional view shown along line A-B of FIG. 5.

Detailed Description of the Embodiment of the Invention

Figure 1:
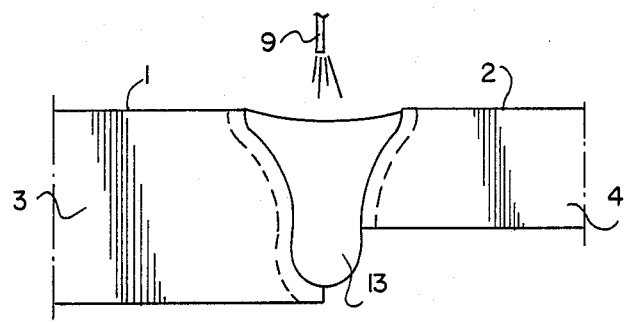
FIGS. 1 to 4 are side views of welded joint zones of pieces of sheet metal of different thicknesses.

Referring to the embodiment illustrated in FIG. 1, surfaces 1, 2 of pieces of sheet metal welded together lie in one plane on the welding side. In contrast, in the embodiment illustrated in FIG. 2 the surfaces 5, 6 of the two pieces of sheet metal 7, 8 lying on the welding side are offset in relation to one another. While in the embodiment illustrated in FIG. 1 welding is performed with a laser beam 9 directed perpendiculary to the surfaces 1, 2, in the embodiment illustrated in FIG. 2 the laser beam 10 is directed at an inclination to the surfaces 5, 6, one component of the beam direction being directed towards the exposed cut edge 11 of the thicker piece 7 of sheet metal, although the top corner 12 is not acted upon by the laser beam 10. A comparison of the shape and extent of the two welds 13, 14 indicates that the weld 14 (embodiment illustrated in FIG. 2) is more favorable, since there is less risk that the toe cracks may occur more particularly in the root zone of the weld.

To prevent a root-side drop-through or root-side suckback at the underside of the joint 14, the joint 14 can be borne at that place on a gas cushion. To this end in the embodiment illustrated in FIG. 2 a cooling element 18 having a duct 21 is placed on the undersides 15, 16 of the two pieces 7, 8 of sheet metal. The duct 21 is in the zone of the joint 14 and is filled with inert gas at excess pressure. The inert gas prevents a root-side drop-through on the underside 22 of the joint 14. Of course, it is possible for the joint to be borne on the rear side of the welding side with a suitably adapted cooling element in the embodiment illustrated in FIG. 1 also.

Figure 2:
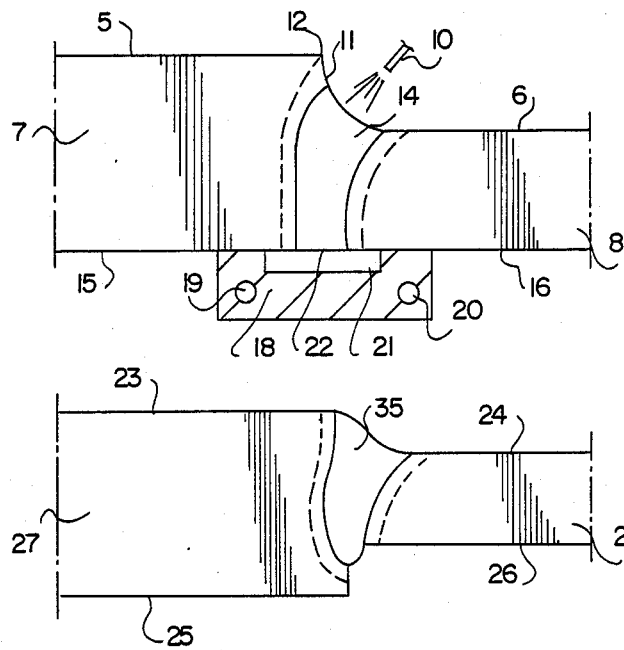
Figure 3:
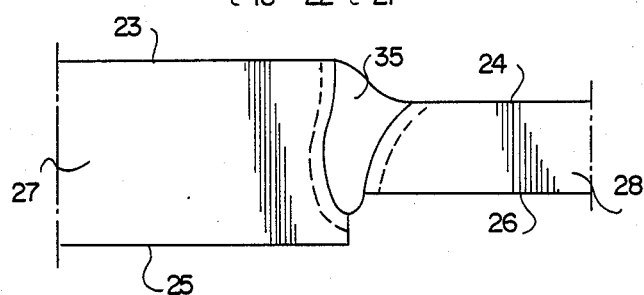
Figure 4:
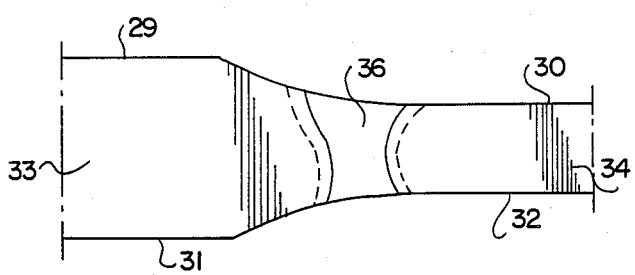

The embodiments illustrated in FIGS. 3 and 4 differ from those illustrated in FIGS. 1 and 2 by the feature that the surfaces 23-26, 29-32 of the two pieces 27, 28, 33, 34 of sheet metal are offset in relation to one another; another difference in the embodiment illustrated in FIG. 4 is that the corners at the cut edge of the thicker piece 33 of sheet metal are so chamfered that the height of the end face substantially corresponds to the thickness of the thinner piece 34 of sheet metal. A similar adaption of thickness may be convenient if there are considerable differences in thickness as between the two pieces of sheet metal.

FIG. 5 is a cross-section of a detail of a deep-drawn shaped part which is welded from pieces 37, 38 of sheet metal of different thicknesses and in which the joint 39 is located in a portion shaped by deep drawing.

What is claimed is:

1. A shaped member of welded pieces of sheet metal of different thickness, more particularly having a metallic anti-corrosion protection, for example of zinc, on at least one side, characterized in that the pieces of sheet metal are joined to one another by a laser-beam-butt-welding process and shaped as a unit.

2. A shaped member according to claim 1, characterized in that the surfaces of the pieces of sheet metal on one side of the shaped member are lying in the same plane.

3. A shaped member according to claim 1, characterized in that a transitional zone from the cut edge to the surfaces of a projecting piece of sheet metal lies outside the welding zone.

4. A shaped member according to claim 1, characterized in that the greater proportion of the welding zone lies in the thicker piece of sheet metal.

5. A shaped member according to claim 1, characterized in that the joint forms a groove in a transitional zone between the exposed part of a cut edge of one piece of sheet metal and the offset surface of the other piece of sheet metal.

* * * * *